United States Patent [19]

Umemoto et al.

[11] Patent Number: 5,003,182

[45] Date of Patent: Mar. 26, 1991

[54] PHOSPHOR, RADIATION IMAGE RECORDING AND REPRODUCING METHOD AND RADIATION IMAGE STORAGE PANEL EMPLOYING THE SAME

[75] Inventors: Chiyuki Umemoto; Yasuo Iwabuchi; Takashi Nakamura; Kenji Takahashi; Yuichi Hosoi, all of Kaisei, Japan

[73] Assignee: Fuji Photo Film Co., Ltd., Kanagawa, Japan

[21] Appl. No.: 423,057

[22] Filed: Oct. 18, 1989

[30] Foreign Application Priority Data

Oct. 18, 1988 [JP] Japan .................................. 63-263530
Jun. 5, 1989 [JP] Japan .................................. 1-143644

[51] Int. Cl.$^5$ .............................................. C09K 11/86
[52] U.S. Cl. .............................. 250/484.1; 250/327.2; 428/691; 252/301.4 H
[58] Field of Search .............. 252/301.4 H; 230/484.1, 230/327.2; 428/691

[56] References Cited

U.S. PATENT DOCUMENTS 4,539,137  9/1985  Kohda et al. ................ 252/301.4 H
4,942,335  7/1990  Mutsaers et al. ............ 252/301.4 H

FOREIGN PATENT DOCUMENTS 60-101178  6/1985  Japan ........................... 252/301.4 H
1-95183    4/1989  Japan ............................... 250/484.1

*Primary Examiner*—Jack Cooper
*Attorney, Agent, or Firm*—Sixbey, Friedman, Leedom & Ferguson

[57] ABSTRACT

There is disclosed a novel cerium activated rare earth oxyhalide phosphor which has the following formula (I):

$$LnOX:xCe \qquad (I)$$

in which Ln is Y, La, Gd or Lu; X is Cl, Br or I; and x is $0 < x \leq 0.2$, and a ratio of X/Ln is $0.500 < X/Ln \leq 0.998$ by atomic ratio, and the maximum peak ($\lambda$) of the stimulation spectrum of the phosphor is 550 nm $< \lambda <$ 700 nm. a radiation image recording and reproducing method and a radiation image storage panel employing the above-mentioned phosphor are also disclosed.

13 Claims, 5 Drawing Sheets

PHOSPHOR, RADIATION IMAGE RECORDING AND REPRODUCING METHOD AND RADIATION IMAGE STORAGE PANEL EMPLOYING THE SAME

BACKGROUND OF THE INVENTION

1. Field of the Invention

The present invention relates to a cerium activated rare earth oxyhalide phosphor, a radiation image recording and reproducing method utilizing the same, and a radiation image storage panel employing the safe.

2. Description of Prior Art

It has been heretofore known that a cerium activated rare earth oxyhalide phosphor having the following formula:

$$LnOX:xCe$$

in which Ln is at least one rare earth element selected from the group consisting of Y, La, Gd and Lu; X is at least one halogen selected from the group consisting of Cl, Br and I; and x is a number satisfying the condition of $0 < x 0.2$, can be employed as a phosphor for a radiographic intensifying screen, since the phosphor gives an emission (spontaneous emission) in the blue light region with the maximum at the wavelength of approx. 380–400 nm when excited with a radiation such as X-rays. Recently, it has been discovered that said cerium activated rare earth oxyhalide phosphor emits light in the blue region when excited with an electromagnetic wave having a wavelength within the region of 450–900 nm after exposure to a radiation such as X-rays, that is, the phosphor gives stimulated emission. Because of the stimulability thereof, the cerium activated rare earth oxyhalide phosphor has been paid much attention and investigated as a phosphor for a radiation image storage panel employable in a radiation image recording and reproducing method utilizing a stimulable phosphor (see: Japanese Patent Publication No. 59(1984)-44339).

The radiation image recording and reproducing method utilizing a stimulable phosphor can be employed in place of the conventional radiography utilizing a combination of a radiographic film and an intensifying screen. The method involves steps of causing a stimulable phosphor to absorb a radiation having passed through an object or radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with the conventional radiography. Accordingly, the radiation image recording and reproducing method is of great value, especially when the method is used for medical diagnosis.

The radiation image storage panel employed for the above-described method generally comprises a support and a stimulable phosphor layer provided on one surface of the support. However, if the phosphor layer is self-supporting, the support may be omitted. Further, a transparent film of a polymer material is generally provided on the free surface (surface not facing the support) of the phosphor layer to protect the phosphor layer from chemical deterioration or physical shock.

There is not only known a stimulable phosphor layer comprising a binder and a stimulable phosphor dispersed therein, but also a phosphor layer comprising agglomerated phosphor (which contains no binder), which can be formed by a sintering method or deposition method (see: U.S. Pat. No. No. 4,789,202; European Patent Application No. 87110090.5). The inventors have also applied for patent with respect to a stimulable phosphor layer of an agglomerated phosphor which is impregnated with a polymer material (U.S. Pat. application No. 184,010; European Patent Application No. 88106327.5). In any kind of the stimulable phosphor layer, the stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

When a radiation image storage panel containing a stimulable phosphor is employed in radiography for the medical diagnosis, it is particularly desired that the sensitivity of the panel to a radiation is made as high as possible to reduce the exposure dose for patient and to facilitate the procedure for converting the stimulated emission to electric signals. Accordingly, it is desired to make the luminance of stimulated emission of the phosphor employed for the panel as high as possible.

In order to make the luminance of stimulated emission of the above-described cerium activated rare earth oxyhalide phosphor high, a process for the preparation of the phosphor was proposed, which has a step of adding tetrafluoroboric acid compounds, hexafluorosilicic acid compounds or metal fluorides to a mixture of starting materials for the phosphor or a heat-treated product of said mixture before firing the mixture (U.S. Pat. No. 4,539,137).

A phosphor of GdOCl:xCe (i.e. Ln=Gd, X=Cl in the above-described formula: LnOX:xCe) in which x is a number satisfying the condition of $0 < x 0.2$ absorbs much amount of X-ray radiation, and exhibits higher luminance of stimulated emission than other cerium activated rare earth oxyhalide phosphors (see Japanese Patent Provisional Publication No. 1(1989)-95183.

The present applicant(s) applied for patent with respect to a process for the preparation of the cerium activated rare earth oxyhalide phosphor, which has a step of firing a mixture of starting materials for the phosphor or a heat-treated product of said mixture under a high pressure, in order to obtain a high-luminance cerium activated rare earth oxyhalide phosphor (U.S. patent application No. 296,212).

The cerium activated rare earth oxyhalide phosphor expressed by the above-described formula consists essentially of cerium as an activator and LnOX as a matrix crystal which has the PbFCl-type crystal structure and is composed of rare earth element Ln, oxygen O and halogen X.

The expression of LnOX in the above-described formula means that rare earth element Ln, oxygen O and halogen X together consist in a matrix crystal whose structure is same as that of PbFCl crystal, and the expression does not mean that the atomic ratio of Ln, O and X is always 1:1:1 in the crystal. However, in any of the above-mentioned references, there is disclosed neither the ratio between Ln and X in the phosphors nor the relation between the characteristics of stimulated emission and the ratio between Ln and X.

In U.S. Pat. No. 4,539,137, there is disclosed the stimulation spectrum of LaOBr:Ce phosphor, which has the maximum near 480 nm. In Japanese Patent Publication No. 59(1984)-44339, a stimulation spectrum of LaOBr:Ce,Tb having the maximum near 580 nm is shown.

The phosphors whose stimulation spectra are disclosed in the above-mentioned references exhibit high luminance of stimulated emission and are suitable for the radiation image recording and reproducing method. However, their maximum peaks of the stimulation spectra are located in shorter wavelengths (530 nm or 480 nm) than a radiation wavelength of He-Ne laser (633 nm), which is commonly used as a light source of stimulating rays, or those of semiconductor laser (680 nm, 750 nm, 780 nm, 830 nm), which is inexpensive light source and is easy to handle. Therefore, these phosphors cannot efficiently absorb the stimulating rays radiated from these lasers.

Although one can choose a light source to match with the radiation wavelength of the source having the wavelength of the maximum peak of the stimulation spectrum, lasers which radiate at shorter wavelengths than He-Ne laser or semi-conductor laser are generally expensive or are too voluminous to handle easily. Further, light sources except lasers are not commonly available for the radiation image recording and reproducing method, because the energy densities per unit area of their rays are too low to stimulate phosphors and the light scanning method using their rays is restricted.

Therefore, the cerium activated rare earth oxyhalide phosphor is desired to have the maximum peak of its stimulation spectrum at longer wavelength than those of the above-mentioned phosphors are, so as to match with the radiation wavelength of He-Ne laser or semiconductor laser.

Naturally, a phosphor which cannot store sufficient radiation energy or of which quantum yield is low does not exhibit high luminance of the stimulated emission, even if the phosphor absorbs stimulating rays efficiently. Therefore, the cerium activated rare earth oxyhalide phosphor is desired to absorb energy of stimulating rays efficiently and to exhibit high luminance of the stimulated emission.

SUMMARY OF THE INVENTION

It is an object of the invention to provide a cerium activated rare earth oxyhalide phosphor of which maximum peak of the stimulation spectrum are located at longer wavelength than those of the known cerium activated rare earth oxyhalide phosphors are and which exhibits high luminance of stimulated emission.

It is another object of the invention to provide a radiation image recording and reproducing method and a radiation image storage panel using a cerium activated rare earth oxyhalide phosphor to have the maximum peak of its stimulation spectrum at longer wavelength than those of the known cerium activated rare earth oxyhalide phosphors are and which exhibits high luminance of stimulated emission.

There are provided by the present invention:

(1) a cerium activated rare earth oxyhalide phosphor having the following formula (I):

$$LnOX:xCe \qquad (I)$$

in which Ln is at least one rare earth element selected from the group consisting of Y, La, Gd and Lu; X is at least one halogen selected from the group consisting of Cl, Br and I; and x is a number satisfying the condition of $0 < x \leq 0.2$, and a ratio between said Ln and said X satisfy the condition of $0.500 < X/Ln \leq 0.998$ by atomic ratio; said phosphor having a maximum peak of a stimulation spectrum of the phosphor is located at $\lambda$ which is a wavelength satisfying the condition of $550 \text{ nm} < \lambda < 700 \text{ nm}$; and (2) a radiation image recording and reducing method comprising the steps of:

(i) causing said cerium activated rare earth oxyhalide phosphor to absorb a radiation having passed through an object or having radiated from an object;

(ii) exposing said stimulable phosphor to an electromagnetic wave having a wavelength within the range of 550–850 nm to release the radiation energy stored therein as light emission; and (iii) detecting the emitted light; and (3) a radiation image storage panel which has phosphor layer including said cerium activated rare earth oxyhalide phosphor.

As described above, the expression of LnOX in the formula (I) means that rare earth element Ln, oxygen O and halogen X together constitute a matrix crystal whose structure is same as that of the PbFCl crystal, and does not specifically mean that the atomic ratio of Ln, O and X is 1:1:1 in the crystal.

The present inventors have studied the relation between the characteristics of stimulated emission of a cerium activated rare earth oxyhalide phosphor and the ratio between Ln and X in the matrix crystal, and discovered that the phosphor of which ratio between Ln and X (X/Ln) is less than 1 by atomic ratio and within a certain region has a maximum peak of the stimulation spectrum located at longer wavelength as compared with the above-mentioned known cerium activated rare earth oxyhalide phosphors, and exhibits high luminance of stimulated emission.

The phosphor of the present invention is particularly useful for the radiation image recording and reproducing method using a He-Ne laser or semi-conductor laser as a stimulating light source, because its maximum peak of the stimulation spectrum matches with the radiation wavelengths of such lasers.

The present inventors have found that the cerium activated rare earth oxyhalide phosphor of which ratio between Ln and X (X/Ln) satisfies the condition of $0.500 < X/Ln < 0.998$ by atomic ratio has a maximum peak of the stimulation spectrum located at $\lambda$ which is a wavelength satisfying the condition of $550 \text{ nm} < \lambda < 700$ nm, and is longer than those of the phosphors of which ratios (X/Ln) satisfy the condition of $0.998 < X/Ln$ (i.e. near 500 nm). The inventors also have found that the phosphor of which X/Ln satisfies the condition of $0.500 < X/Ln \leq 0.998$ by atomic ratio exhibits higher luminance of stimulated emission than those of the phosphors in which atomic ratios (X/Ln) satisfy the condition of 0.998 < X/Ln. The inventors further have found that the phosphors of which ratios (X/Ln) are lower than 0.500 exhibit low luminance of the stimulated emission, and which is due to formation of some other crystal structures in the desired crystals, although their maximum peaks of the stimulation spectra are located within a longer wavelength region than near 500 nm.

In the process of the preparation for the phosphor of the present invention, the ratio between rare earth Ln and halogen X of the aimed phosphor can be controlled by varying the relative amount of rare earth oxide and halogen donator (a preparation ratio) in a mixture of the starting materials.

The phosphor of the present invention prepared in accordance with the above-mentioned process has a maximum peak of the stimulation spectrum which is located within a longer wavelength region than those of the known cerium activated rare earth oxyhalide phosphors are. Further, the phosphor of the invention absorbs efficiently energy of stimulating rays radiated from He-Ne lasers or semiconductor lasers, which are advantageous sources of stimulating light, and exhibits high luminance of the stimulated emission. Therefore, a radiation image recording and reproducing method and a radiation image storage panel of the present invention employing said phosphor are very advantageous.

DETAILED DESCRIPTION OF THE INVENTION

Figure 1:
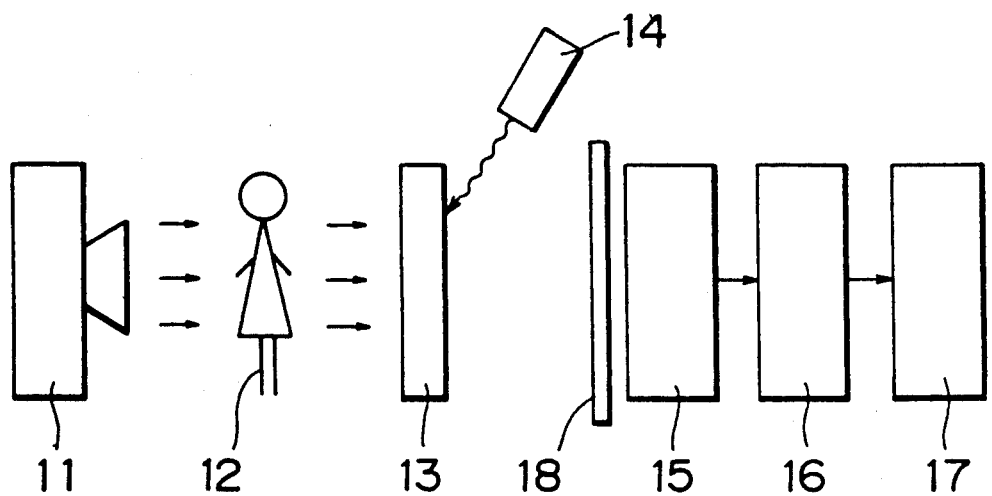
FIG. 1 is a schematic view showing the radiation image recording and reproducing method according to the present invention.

The cerium activated rare earth oxyhalide phosphor of the present invention can be prepared, for instance, by a process described below.

As the starting materials for the preparation of the phosphor, the following materials can be employed in the process of the invention:

(1) at least one rare earth oxide selected from the group consisting of $Y_2O_3$, $La_2O_3$, $Gd_2O_3$ and $Lu_2O_3$, (in some cases the rare earth oxide may be replaced with a rare earth compound such as an oxalate or a carbonate which can be easily converted into the rare earth oxide by heating it at a high temperature);

(2) at least one halogen donator capable of donating at least one halogen selected from the group consisting of Cl, Br and I; and (3) at least one cerium compound (cerium halide, cerium oxide, cerium nitrate, cerium sulfate, etc.).

Examples of the above mentioned halogen donator (2) include ammonium halide ($NH_4X$), hydrogen halide(HX) in the form of an aqueous solution and a gas, and rare earth halide ($LnX_3$, in which X is any one of Cl, Br and I; and Ln is any one of Y, La, Gd and Lu). In the case of using the rare earth halide as a halogen donator, the halogen donator is to donate a portion or whole of the rare earth element which serves as a host component of the phosphor as well as the halogen also serving as the host component thereof.

In the process of the preparation for the phosphor of this invention, the ratio between rare earth Ln and halogen X is controlled by varying the relative amount of rare earth oxide and halogen donator (a preparation ratio) in the mixture of the starting materials. Therefore, it is preferable to use ammonium halide as halogen donator, which is easy to control the relative amount of rare earth oxide and halogen donator.

The process of the preparation for the phosphor of the present invention will be described in more detail with respect to an example of the case using ammonium halide as halogen donator.

In the first place, the above-mentioned starting materials (1) to (3) are mixed in an appropriate amount to prepare a mixture thereof. An amount of cerium compound (3) is determined stoichiometrically according to the formula (I). In more detail, the cerium compound is added to the mixture so that cerium atom amounts to x mol per 0.5 mol (i.e., Ln 1 mol) of rare earth oxide $Ln_2O_3$.

The mixing procedure is carried out by means of a conventional mixing apparatus such as a variety of mixers, a V-type blender, a ball mill and a rod mill.

The obtained mixture of the starting materials for the phosphor is placed in a heat-resistant container such as a quartz boat, an alumina crucible or a quartz crucible and fired in an electric furnace.

Before the firing procedure, the mixture of the starting materials for phosphor may be heat-treated at a temperature lower than the temperature for the firing in order to form a LnOX crystal beforehand. The temperature for the firing suitably ranges from 500° to 1,500° C., and preferably ranges from 700° to 1,400° C. The firing period is determined depending upon the amount of the mixture of the starting materials or the heat-treated product thereof charged in the heat-resistant container, the firing temperature, etc. Generally, the firing period ranges from 0.5 to 20 hours, and preferably ranges from 1 to 3 hours.

As the firing atmosphere, there can be employed a weak reducing atmosphere such as a nitrogen gas atmosphere containing a small amount of hydrogen gas or a carbon dioxide gas atmosphere containing carbon monoxide gas, and inert atmosphere such as a nitrogen gas atmosphere and an argon gas atmosphere. In the case of using cerium (IV) compounds, a weak reducing atmosphere is employed for the firing procedure, and in the firing procedure, cerium (IV) is reduced to cerium (III).

The product obtained by the firing under the above-mentioned conditions is taken out of the furnace, allowed to stand for cooling and pulverized. The pulverized product may be again placed in the heat-resistant container and fired in the electric furnace. For conducting the second firing, there can be employed the above-mentioned weak reducing atmosphere or inert atmosphere.

The ratio between rare earth Ln and halogen X in the phosphor is controlled by varying the relative amount of rare earth oxide and halogen donator (a preparation ratio) in the mixture of the starting materials and/or by selecting the atmosphere in the firing stage. In the case of using ammonium halide as halogen donator, the ratio between rare earth Ln and halogen X in the phosphor is controlled by varying the relative amount of rare earth oxide $Ln_2O_3$ and ammonium halide $NH_4X$ in the mixture of the starting materials and/or by selecting the atmosphere in the firing stage in order that the ratio X/Ln satisfies the condition of $0.500 < X/Ln \leq 0.998$ by atomic ratio.

Preferably, the ratio X/Ln is not more than 0.995, and more preferably not more than 0.990 by atomic ratio, because such phosphor exhibits high luminance of stimulated emission. For the same reason, the ratio X/Ln is preferably not less than 0.700, and more preferably not less than 0.800 by atomic ratio.

After the firing is completed, the fired product is finely pulverized to obtain a powdery phosphor of the invention. The powdery phosphor thus obtained may be processed in a conventional manner involving a variety of procedures for the preparation of phosphors such as a washing procedure, a drying procedure and a sieving procedure.

The phosphor of the present invention prepared in accordance with the above-mentioned process is a cerium activated rare earth oxyhalide phosphor having the following formula (I):

$$LnOX:xCe \qquad (I)$$

in which Ln is at least one rare earth element selected from the group consisting of Y, La, Gd and Lu; X is at least one halogen selected from the group consisting of Cl, Br and I; and x is a number satisfying the condition of $0 < x \leq 0.2$, a ratio between said Ln and said X satisfy the condition of $0.500 < X/Ln \leq 0.998$ by atomic ratio; said phosphor having a maximum peak of a stimulation spectrum of the phosphor is located at λ which is a wavelength satisfying the condition of $550 \text{ nm} < \lambda < 700 \text{ nm}$.

The present invention of the radiation image recording and reproducing method utilizing the above-mentioned phosphor will be described hereinafter. In the present invention of the radiation image recording and reproducing method, it is preferable that the above-mentioned phosphor is employed in the form of a radiation image storage panel containing the phosphor.

In the radiation image recording and reproducing method of the present invention employing the above-mentioned stimulable phosphor in the form of a radiation image storage panel, a radiation having passed through an object or radiated from an object is absorbed by the phosphor layer of panel to form a radiation image as a radiation energy stored image on the panel. The panel is then excited (e.g. scanned) with an electromagnetic wave (stimulating light) in the wavelength region of 550–850 nm to release the stored image as stimulated emission. The emitted light is photoelectrically detected to obtain electric signals so that the radiation image of the object can be recording and reproducing as a visible image from the obtained electric signals.

The radiation image recording and reproducing method of the present invention will be described in more detail with respect to an example of a radiation image storage panel containing the above-mentioned stimulable phosphor, by referring to the schematic view shown in FIG. 1.

In FIG. 1 which shows the total system of the radiation image recording and reproducing method of the invention, a radiation generating device 11 such as X-ray source provides for irradiating an object 12 therewith; a radiation image storage panel 13 containing the stimulable phosphor of the present invention absorbs and stores the radiation having passed through the object 12; a source of stimulating rays 14 provides an electromagnetic wave for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image; and a filter 18 is disposed in front of the photosensor 15 to cut off the stimulating rays reflected by the panel 13 and allow only the light emitted by the panel 13 to pass through.

FIG. 1 illustrates an example of the system according to the method of the invention employed for obtaining a radiation-transmission image of an object. However, in the case that the object 12 itself emits a radiation, it is unnecessary to install the above-mentioned radiation generating device 11. Further, the photosensor 15 to the display device 17 in the system can be replaced with other appropriate devices which can reproduce a radiation image having the information of the object 12 from the light emitted by the panel 13.

Referring to FIG. 1, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus a radiation energy-stored image (a kind of latent image) corresponding to the radiation-transmission image of the object 12 is formed on the panel 13.

Thereafter, when the radiation image storage panel 13 is irradiated with an electromagnetic wave having the wavelength within the range of 550–850 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15, the electric signals are reproduced as an image in the image reproducing device 16, and the reproduced image is displayed on the display device 17.

The operation of reading out the image information stored in the radiation image storage panel generally carried out by sequentially scanning the panel with laser beam and detecting the light emitted under the scanning with a photosensor such as photomultiplier through a light guiding means to obtain electric signals. In order to obtain a well readable visible image, the read-out operation may comprise a preliminary read-out operation of irradiating the panel with stimulating rays having energy lower than that in the following final read-out operation and the final read-out operation of irradiating the panel with stimulating rays (see: Japanese Patent Provisional Publication No. 58(1983)- 67240). The read-out condition in the final read-out operation can be suitably set based on the result obtained by the preliminary read-out operation.

As the photosensor, solid-state photoelectric conversion devices such as a photoconductor and a photodiode can be also used (see: Japanese Patent Provisional Publications No. 59(1984)-211263, No. 59(1984)-211264, No.60(1985) 111568, No. 60(1985)- 111568, No. 60 (1985)-111571 and No. 58(1983)-121874). For example, the photosensor is divided into a great number of pixels, which may be combined with a radiation image storage panel or position in the vicinity of the panel. Otherwise, the photosensor may be a line-sensor in which plural number pixels are linearly connected or may be such one that corresponds to one pixel.

In above-mentioned cases, there may be employed for the source of stimulating rays a linear light source such as an array in which light emitting diodes (LED), semi-conductor lasers or the like are linearly arranged, in addition to a point light source such as a laser. For example, in the case of using a linear light source for stimulation and a line-sensor for photoelectric conversion, it is possible to enhance the read-out speed, because electric signals are sequentially obtained by parallel electrical processing of the photosensor.

After reading out the image information stored in a radiation image storage panel, the panel is preferably subjected to a procedure of erasing the radiation energy remaining therein, that is, to the exposure to light having a wavelength in the wavelength region of stimulating rays for the phosphor contained therein or to heating (see: Japanese Patent Provisional Publications No. 56(1981)-11392 and No.56(1981) 12599). It can prevent noise occurring due to the after image in the next use of the panel by carrying out the erasing procedure. Further, the panel can be more effectively prevented from the occurrence of noise attributable to natural radiations by carrying out the erasing procedure two times, namely after the read-out and just before the next use (see: Japanese Patent Provisional Publication No. 57(1982)-116300).

In the radiation image recording and reproducing method of the present invention, there is no specific limitation on the radiation employable for exposure of an object to obtain a radiation transmittance image thereof, as far as the above-described phosphor gives stimulated emission upon excitation with the electromagnetic wave after exposure to the radiation. Examples of the radiation employable in the invention include those generally known, such as X-rays, cathode rays, ultraviolet rays and neutron rays. Likewise, there is no specific limitation on the radiation radiating from an object for obtaining a radiation image thereof, as far as the radiation can be absorbed by the above-described phosphor to serve as an energy source for producing the stimulated emission rays for exciting: Examples of the radiation include $\gamma$-rays, $\alpha$-rays and $\beta$-rays.

The radiation image recording and reproducing method of the present invention employs the cerium activated rare earth oxyhalide phosphor of which maximum peak of the stimulation spectrum is located in longer wavelength region than those of the known cerium activated rare earth oxyhalide phosphors are, in order to use effectively the stimulating rays of longer wavelength region. Therefore, in the present invention, the wavelength region of stimulating rays is appropriately within 550–850 nm, and is preferably within 600–830 nm. As the source of stimulating rays within such wavelength region, there can be employed, for instance, light sources providing light having a band spectrum distribution in the wavelength region of 550–850 nm; and lasers such as a Kr ion laser (radiation wavelengths: 568 nm, 647 nm, 676 nm and 753 nm), a He-Ne laser (radiation wavelength: 633 nm), a ruby laser (radiation wavelength: 694 nm), a semiconductor laser (radiation wavelengths: 680 nm, 750 nm, 780 nm, 830 nm, etc.), a dye laser (radiation wavelengths: Rhodamine 6G: 565–620 nm, Rhodamine B: 600–650 nm); and a light emitting diode. Among above-mentioned sources of stimulating rays, the lasers are preferred because the radiation image storage panel is exposed thereto with a high energy density per unit area. In view of stability, power and wavelengths of radiation, preferred are a He-Ne laser, a Kr ion laser and a semiconductor laser. Among then, a He-Ne laser and a semiconductor laser are more preferred, because they are inexpensive and easy to handle. A semiconductor laser is the most preferred source of stimulating rays, because it is small, consumes a little electric power and its power of radiation is easy to be stabilized with direct modulation.

As the light source for erasing the radiation energy remaining in the radiation image storage panel, a light source at least providing light of wavelength within the wavelength region of stimulating rays for the stimulable phosphor is employed. Examples of the light source include a tungsten lamp, a fluorescent lamp, a halogen lamp, a high-pressure sodium lamp and a low-pressure sodium lamp.

The recording and read-out of a radiation image in the method of the invention can be carried out by using a built-in type radiation image conversion apparatus which comprises a recording section for recording the radiation image on a radiation image storage panel (i.e. causing a stimulable phosphor of the panel to absorb and store radiation energy), a read-out section for reading out the radiation image recorded on the panel (i.e. irradiating the phosphor with stimulating rays to release the radiation energy as light emission), and erasure section for eliminating the radiation image remaining in the panel (i.e., causing the phosphor to release the remaining energy) (see: Japanese Patent Provisional Publications No. 581 (1983)-200269 and No. 59(1984)-192240). By employing such built-in type apparatus, the radiation image storage panel (or a recording medium containing a stimulable phosphor) can be circularly and repeatedly used and a number of images having a quality at a certain level can be stably obtained. And such built-in type apparatus is made so compact and light weight as to be easily set and moved. It is possible to move the apparatus place to place to record the radiation images by loading a traveling X-ray diagnosis station in the form of a vehicle or the like with the apparatus.

The radiation image storage panel of the present invention will be described.

The radiation image storage panel, as described hereinbefore, generally comprises a support and the phosphor layer provided thereon which comprises the above-mentioned phosphor of the invention. However, if the phosphor layer is self-supporting, the support may be omitted.

There is not only known a conventional stimulable phosphor layer comprising a binder and a stimulable phosphor dispersed therein, but also a phosphor layer comprising agglomerated phosphor without binder (see: U.S. patent application No. 072,698; European Patent Application No. 87110090.5) and a phosphor layer of an agglomerated phosphor which is impregnated with a polymer material (U.S. patent application No. 184,010; European Patent Application No. 88106327.5). Any kind of the stimulable phosphor layer is employable for the radiation image storage panel of the present invention so long as the above-mentioned phosphor is included in the layer.

The radiation image storage panel of the present invention will be described in more detail with respect to an example of the panel comprising a support and a phosphor layer provided thereon which comprises a binder and a stimulable phosphor dispersed therein.

The phosphor layer can be formed on the support, for instance, in the manner described below.

In the first place, the phosphor of the invention obtained in the above-described manner and a binder are added to an appropriate solvent, and they are well mixed to prepare a dispersion in which the stimulable phosphor particles are homogeneously dispersed in a binder solution.

Examples of the binder to be employed in the phosphor layer include: natural polymers such as proteins (e.g., gelatin), polysaccharides (e.g., dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, polyurethane, a mixture of nitrocellulose and linear polyester, and a mixture nitrocellulose and polyalkyl (meth)acrylate.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixture of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycol with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

A support material employed in the present invention can be selected from those employed in the conventional radiographic intensifying screens or those employed in the known radiation image storage panels. Examples of the support material include plastic films such as cellulose acetate, polyester, polyethylene terephthalate, polyamide, polyimide, triacetate and polycarbonate; metal sheets such as aluminum foil and aluminum alloy foil; ordinary paper; baryta paper; resin-coated paper; pigment paper containing titanium dioxide or the like; and paper sized with polyvinyl alcohol or the like; ceramic plates; and sheets such as alumina, zirconia, magnesia and titania.

In the preparation of a known radiation image storage panel, one or more additional layers are occasionally provided between the support and the phosphor layer, so as to enhance the adhesion between the support and the phosphor layer, or to improve the sensitivity of the panel or the quality of an image provided thereby. For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided according to the characteristics of the aimed radiation image storage panel.

As described in U.S. Pat. No. 4,575,635 (the whole content of which is described in European Patent Publication No. 92241), the phosphor layer-side surface of the support (or the surface of an adhesive layer, light-reflecting or light-absorbing later in the case that such layers are provided on the phosphor layer) may be provided with protruded and depressed portions for enhancement of the sharpness of radiation image.

After applying the coating dispersion to the support as described above, the coating dispersion is then dried so as to complete the formation of a phosphor layer. The thickness of the phosphor layer varies depending upon the characteristic of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layers are placed, at least one layer contains the aforementioned phosphor of the invention, and the plural layers may be placed in such a manner that a layer nearer to the surface shows stimulated emission of higher intensity. In any case, that is, in either the single phosphor layer or plural phosphor layers, a variety of known stimulable phosphors are employable in combination with the above-mentioned stimulable phosphor.

Examples of the stimulable phosphor employable in combination with the aforementioned stimulable phosphor in the radiation image storage panel of the invention include the aforementioned known cerium activated rare earth oxyhalide phosphor and the phosphors described below;

ZnS:Cu,Pb,BaO.$x$Al$_2$O$_3$:Eu, in which x is a number satisfying the condition of $0.8 < x \leq 10$, and M$^{II}$O.$x$SiO$_2$:A, in which M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 < x \leq 2.5$, as described in U.S. Pat. No. 4,326,078;

(Ba$_1$−x−y,Mg$_x$,Ca)FX:aEu$^{2+}$, in which X is at least one element selected from the group consisting of Cl and Br, x and y are numbers satisfying the conditions of $0 < x+y \leq 0.6$ and $xy \neq 0$, and a is a number satisfying the condition of $10^{-6} \leq a \leq 5 \times 10^{-2}$, as described in Japanese Patent Publication No. 60(1985)-42837.

A radiation image storage panel generally has a transparent film on a free surface of a phosphor layer to physcally and chemically protect the phosphor layer. In the panel of the present invention, it is preferable to provide a transparent film for the same purpose.

The transparent protective film can be formed on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing a film for forming a protective film from a plastic sheet made of polyethylene terephthalate, polyethylene naphthalate, polyethylene, polyvinylidene chloride or polyamide; or transparent glass sheet, followed by placing and fixing it onto the phosphor sheet with an appropriate adhesive agent.

The protective film and the phosphor layer can be formed at the same time by sintering an inorganic material for the protective film such as an oxide (e.g. SiO$_2$, Al$_2$O$_3$), a fluoride (e.g. MgF$_2$) and a carbonate (e.g. SiC), together with a mixture of starting materials for the phosphor layer. The protective film also can be formed by depositing said materials on the surface of the phosphor layer, or by heating an inorganic material having a low melting point to melt on the phosphor layer and coating said melted material on the surface of the phosphor layer. An inorganic coating reagent is also available for forming the protective film.

If a radiation image storage panel has no support, it is preferred that the protective films are provided on the both surfaces (i.e. the top surface and the bottom surface) of the phosphor layer.

The transparent protective film generally has a thickness within the range of approximately 0.1 to 20 μm.

In addition to the above-mentioned layers, the radiation image storage panel of the present invention may have a colored layer which absorbs stimulating rays and does not absorb stimulated emission, in order to improve the sharpness of the image provided thereby (see: Japanese Patent Publication No. 59(1984)-23400).

Examples of the present invention are given below, but the examples are construed by no means to restrict the invention.

EXAMPLE 1

Preparation of cerium activated gadolinium oxychloride phosphor and a radiation image storage panel employing the same (A) Preparation of the phosphor 362.5 g (1 mol) of gadolinium oxide (Gd$_2$O$_3$), 96.28 g (1.8 mol) of ammonium chloride (NH$_4$Cl) and 0.493 g ($2 \times 10^{-3}$ mol) of cerium chloride (CeCl$_3$) were mixed in a dry process. The obtained mixture of the starting materials for the phosphor was placed in an alumina crucible, and was fired in a high-temperature electric furnace. The firing was carried out at 1,100° C. for 2 hours in a weak reducing atmosphere of carbon monoxide. After the firing was completed, the fired product was taken out the furnace and allowed to stand for cooling. The cooled product was pulverized and washed with methanol.

Thus, a powdery cerium activated gadolinium oxychloride phosphor (GdOCl:10$^{-3}$ Ce$^{3+}$) was obtained.

The ratio between Gd and Cl included in the phosphor was determined by the following manner.

First, the aqueous solution of the phosphor was prepared. Then, the ratio Cl/Gd was determined by measuring the concentration of Gd and Cl in the solution by means of chelatometric titration analysis (JIS K0211-1088) and potentiometric titration analysis (JIS K02113-3027), respectively. From the results of the measurements, the ratio Cl/Gd of the phosphor was determined as Cl/Gd=0.640 by atomic ratio.

(B) Preparation of a radiation image storage panel

To a mixture of 300 g of the phosphor obtained in the above-mentioned preparation, 8.4 g of polyurethane resin (krisbone NT-50: available from Dainippon Ink Chem., Co., Ltd.) and 1.5 g of nitrocellulose (RS-120: available from Daicel Co., Ltd) was added methyl ethyl ketone (volume ratio: 1:1) to prepare a dispersion containing the phosphor and the binder (30:1, by weight). The mixture was sufficiently stirred by means of a propeller agitator to obtain a homogeneous coating dispersion having a viscosity of 25-35 PS (at 25° C.).

The coating dispersion was applied to a polyethylene terephthalate sheet containing titanium dioxide (support, thickness: 250 μm) which was placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting of a support, a phosphor layer and a transparent protective film was prepared.

EXAMPLE 2

The procedure of Example 1 was repeated except for using a mixture of 290 g (0.8 mol) of gadolinium oxide (Gd$_2$O$_3$), 106.9 g (2.0 mol) of ammonium chloride (NH$_4$Cl) and 0.394 g ($1.6 \times 10^{-3}$ mol) of cerium chloride (CeCl$_3$) as a mixture of starting materials for the phosphor, to obtain a powdery cerium activated gadolinium oxychloride phosphor (GdOCl:$10^{-3}$ $Ce^{3+}$).

The ratio between Gd and Cl included in the phosphor was determined in the same manner described in Example 1, and was found: Cl/Gd = 0.730 by atomic ratio.

A radiation image storage panel using said phosphor was also prepared in the same manner described in Example 1.

EXAMPLE 3

The procedure of Example 1 was repeated except for using a mixture of 290 g (0.8 mol) of gadolinium oxide ($Gd_2O_3$), 106.9 g (2.0 mol) of ammonium chloride ($NH_4Cl$) and 0.394 g ($1.6 \times 10^{-3}$ mol) of cerium chloride ($CeCl_3$) as a mixture of starting materials for the phosphor and firing it at 1,400° C. for 2 hours in an inert atmosphere of nitrogen gas, to obtain a powdery cerium activated adolinium oxychloride phosphor (GdOCl:$10^{-3}$ $Ce^{3+}$).

The ratio between Gd and Cl included in the phosphor was determined in the same manner described in Example 1, and was found: Cl/Gd = 0.980 by atomic ratio.

A radiation image storage panel using said phosphor was also prepared in the same manner described in Example 1.

EXAMPLE 4

The procedure of Example 3 was repeated except for using a mixture of 290 g (0.8 mol) of gadolinium oxide ($Gd_2O_3$), 128.28 g (2.4 mol) of ammonium chloride ($NH_4Cl$) and 0.394 g ($1.6 \times 10^{-3}$ mol) of cerium chloride ($CeCl_3$) as a mixture of starting materials for the phosphor, to obtain a powdery cerium activated gadolinium oxychloride phosphor (GdOCl:$10^{-3}$ $Ce^{3+}$).

The ratio between Gd and Cl included in the phosphor was determined in the same manner described in Example 1, and was found: Cl/Gd = 0.990 by atomic ratio.

A radiation image storage panel using said phosphor was also prepared in the same manner described in Example 1.

COMPARISON EXAMPLE 1

The procedure of Example 1 was repeated except for using a mixture of 290 g (0.8 mol) of gadolinium oxide ($Gd_2O_3$), 42.76 g (0.8 mol) of ammonium chloride ($NH_4Cl$) and 0.394 g ($1.6 \times 10^{-3}$ mol) of cerium chloride ($CeCl_3$) as a mixture of starting materials for the phosphor, to obtain a powdery cerium activated gadolinium oxychloride phosphor (GdOCl:$10^{-3}$ $Ce^{3+}$).

The ratio between Gd and Cl included in the phosphor was determined in the same manner described in Example 1, and was found: Cl/Gd = 0.400 by atomic ratio.

A radiation image storage panel using said phosphor was also prepared in the same manner described in Example 1.

COMPARISON EXAMPLE 2

The procedure of Example 1 was repeated except for using a mixture of 290 g (0.8 mol) of gadolinium oxide ($Gd_2O_3$), 171.04 g (3.2 mol) of ammonium chloride ($NH_4Cl$) and 0.394 g ($1.6 \times 10^{-3}$ mol) of cerium chloride ($CeCl_3$) as a mixture of starting materials for the phosphor, to obtain a powdery cerium activated gadolinium oxychloride phosphor (GdOCl:$10^{-3}$ $Ce^{3+}$).

The ratio between Gd and Cl included in the phosphor was determined in the same manner described in Example 1, and was found: Cl/Gd = 1.000 by atomic ratio.

A radiation image storage panel using said phosphor was also prepared in the same manner described in Example 1.

COMPARISON EXAMPLE 3

The procedure of Example 1 was repeated except for using a mixture of 290 g (0.8 mol) of gadolinium oxide ($Gd_2O_3$), 213.8 g (4.0 mol) of ammonium chloride ($NH_4Cl$) and 0.394 g ($1.6 \times 10^{-3}$ mol) of cerium chloride ($CeCl_3$) as a mixture of starting materials for the phosphor, to obtain a powdery cerium activated gadolinium oxychloride phosphor (GdOCl:$10^{-3}$ $Ce^{3+}$).

The ratio between Gd and Cl included in the phosphor was determined in the same manner described in Example 1, and was found: Cl/Gd = 1.030 by atomic ratio.

A radiation image storage panel using said phosphor was also prepared in the same manner described in Example 1.

The ratios (Cl/Gd) of the phosphors prepared in Examples 1–3 and Comparison Examples 1–3 are set forth in Table 1.

TABLE 1

| | Cl/Gd (atomic ratio) |
| --- | --- |
| Example 1 | 0.640 |
| Example 2 | 0.730 |
| Example 3 | 0.980 |
| Example 4 | 0.990 |
| Comparison Example 1 | 0.400 |
| Comparison Example 2 | 1.000 |
| Comparison Example 3 | 1.030 |

There were measured the stimulation spectra and the luminances of stimulated emission of the radiation image storage panels prepared in above-mentioned examples, which have phosphor layers comprising various cerium activated adolinium oxychloride phosphors in which the ratios (Cl/Gd) are different each other.

Measurement of stimulation spectrum

Figure 2:
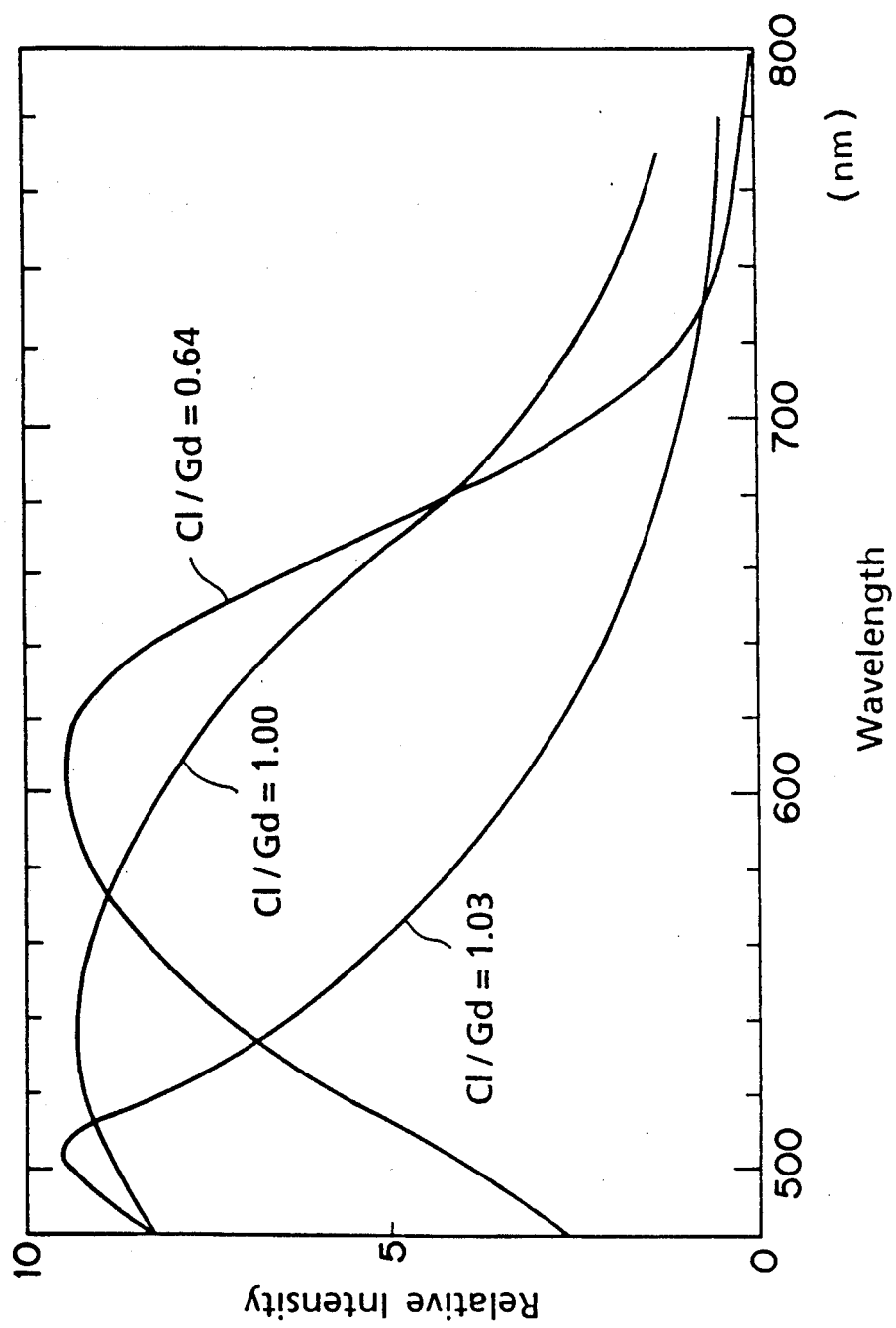
FIG. 2 shows stimulation spectra of the phosphor of present invention and some related phosphors.
Figure 3:
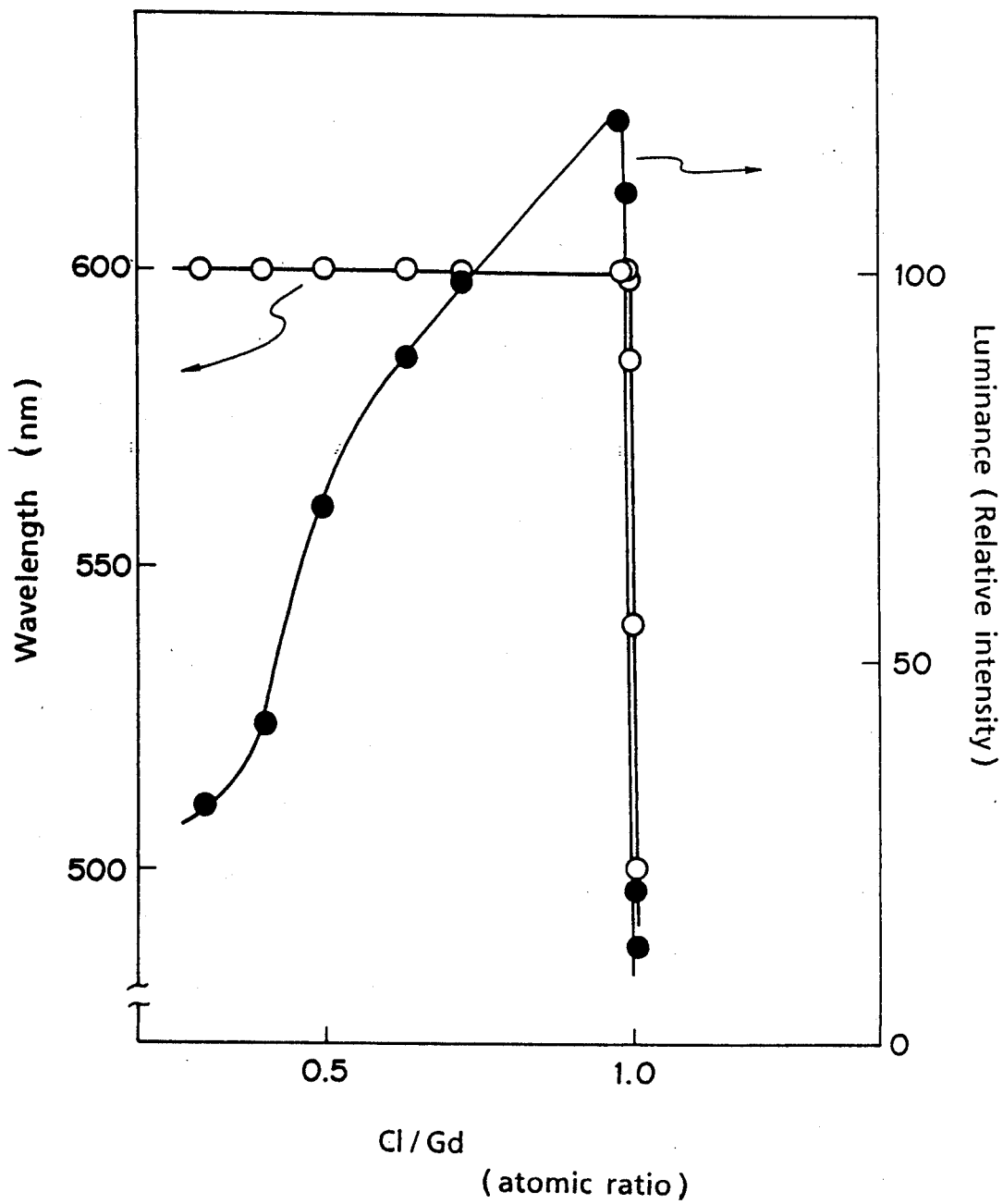
FIG. 3 shows relation between the wavelength of the maximum peak of stimulation spectrum and the ratio Cl/Gd, and relation between the luminance of stimulated emission and the specific ratio Cl/Gd.

The results of the measurements of stimulation spectra are illustrated in FIG. 2 and FIG. 3.

FIG. 2 illustrates variations of intensity of stimulated emissions (i.e., stimulation spectra) at the wavelength of 385 nm given when exciting the radiation image storage panels of Example 1 (Cl/Gd = 0.640), Comparison Example 2 (Cl/Gd = 1.000) and Comparison Example 3 (Cl/Gd = 1.030) with light whose wavelength is varied after exposure to X-rays at 80 KVp.

FIG. 3 also illustrates the wavelengths of the maximum peaks of stimulation spectra of the radiation image storage panels prepared in Example 1–3 and Comparison Example 1–3, and of those prepared in the same manner as the examples, which include the phosphors having a variety of the ratios (Cl/Gd).

The plots of open-circles ( ) in FIG. 3 stand for the relations between the ratios (Cl/Gd) and the locations of the maximum peaks of stimulation spectra.

As is evident from FIG. 2 and FIG. 3, the maximum peak of stimulation spectrum of the phosphor of the present invention ($0.500 < Cl/Gd \leqq 0.998$) is located at longer wavelength than those of the phosphors of which ratios (X/Ln) satisfy the condition of $0.998 < X/Ln$ are.

Measurement of luminance of stimulated emission

The luminances of stimulated emissions were also measured. Each of the panels was exposed to X-rays at 40 KVp, and after 5 minutes, excited with the light of 633 nm passed through a spectroscope and filters. The stimulated emission emitted from the panel passed through a filter and was detected by the detector (photomultiplier having a sensitivity of S-5; voltage 600 V) to measure a luminance of stimulated emission thereof. The results are shown in Table 2 and FIG. 3.

With respect to the radiation image storage panels of Example 2 (Cl/Gd=0.730), Example 3 (Cl/Gd=0.980), Example 4 (Cl/Gd=0.990), Comparison Example 1 (Cl/Gd=0.400) and Comparison Example 3 (Cl/Gd=1.030), their luminances of stimulated emissions measured in the above-described manner are set forth in Table 2, in which the values of luminances are relatively determined on the basis of the luminance of the panel of Example 2 to be set at 100.

TABLE 2

|  | Cl/Gd (atomic ratio) | luminance (relative value) |
| --- | --- | --- |
| Example 2 | 0.730 | 100 |
| Example 3 | 0.980 | 120 |
| Example 4 | 0.990 | 110 |
| Comparison Example 1 | 0.400 | 42 |
| Comparison Example 3 | 1.030 | 13 |

FIG. 3 also illustrates the measured luminances of stimulated emissions of the radiation image storage panels prepared in Example 1–3 and Comparison Example 1–3, and of those prepared in the same manner as the examples, which include the phosphors having a variety of the ratios (Cl/Gd).

The plots of solid-circles ( ) in FIG. 3 stand for the relations between the ratios (Cl/Gd) and the measured luminances of stimulated emissions, with respect to the panels which include the phosphors having a variety of the ratios (Cl/Gd). (In FIG. 3, the right ordinate is graduated in relative value determined on the basis of the luminance of the panel of Example 2 to be set at 100.) As is evident from the above-mentioned plots and Table 2, the luminance of stimulated emission of the radiation e storage panel of the present invention ($0.500 < Cl/Gd \leq 0.998$) is much higher than those of the panels which include the phosphors whose ratios (Cl/Gd) do not satisfy said condition.

EXAMPLE 5

Preparation of cerium activated lanthanum oxybromide phosphor and a radiation image storage panel employing the same The procedure of Example 1 was repeated except for using a mixture of 260.64 g (0.8 mol) of lanthanum oxide ($La_2O_3$), 195.8 g (2.0 mol) of ammonium bromide ($NH_4Br$) and 0.608 g ($1.6 \times 10^{-3}$ mol) of cerium bromide ($CeBr_3$) as a mixture of starting materials for the phosphor, to obtain a powdery cerium activated lanthanum oxybromide phosphor ($LaOBr:10^{-3} Ce^{3+}$).

The ratio between La and Br included in the phosphor was determined by the following manner.

First, the aqueous solution of the phosphor was prepared. Then, the ratio Br/La was determined by measuring the concentration of La and Br in the solution by means of chelatometric titration analysis and potentiometric titration analysis, respectively. From the results of the measurements, the ratio Br/La of the phosphor was determined as Br/La=0.700 by atomic ratio.

A radiation image storage panel using said phosphor was prepared in the same manner described in Example 1.

COMPARISON EXAMPLE 4

The procedure of Example 1 was repeated except for using a mixture of 260.64 g (0.8 mol) of lanthanum oxide ($La_2O_3$), 97.9 g (1.0 mol) of ammonium bromide ($NH_4Br$) and 0.608 g ($1.6 \times 10^{-3}$ mol) of cerium bromide ($CeBr_3$) as a mixture of starting materials for the phosphor, to obtain a powdery cerium activated lanthanum oxybromide phosphor ($LaOBr:10^{-3} Ce^{3+}$).

The ratio between La and Br included in the phosphor was determined in the same manner described in Example 5, and was found: Br/La=0.430 by atomic ratio.

A radiation image storage panel using said phosphor was prepared in the same manner described in Example 1.

COMPARISON EXAMPLE 5

The procedure of Example 1 was repeated except for using a mixture of 260.64 g (0.8 mol) of lanthanum oxide ($La_2O_3$), 391.6 g (4.0 mol) of ammonium bromide ($NH_4Br$) and 0.608 g ($1.6 \times 10^{-3}$ mol) of cerium bromide ($CeBr_3$) as a mixture of starting materials for the phosphor, to obtain a powdery cerium activated lanthanum oxybromide phosphor ($LaOBr:10^{-3} Ce^{3+}$).

The ratio between La and Br included in the phosphor was determined in the same manner described in Example 5, and was found: Br/La=1.520 by atomic ratio.

A radiation image storage panel using said phosphor was prepared in the same manner described in Example 1.

Measurement of stimulation spectrum

The stimulation spectrum of the radiation image storage panel of Example 5 was measured in the same manner of the cases of $GdOCl:10^{-3}Ce^{3+}$.

Figure 4:
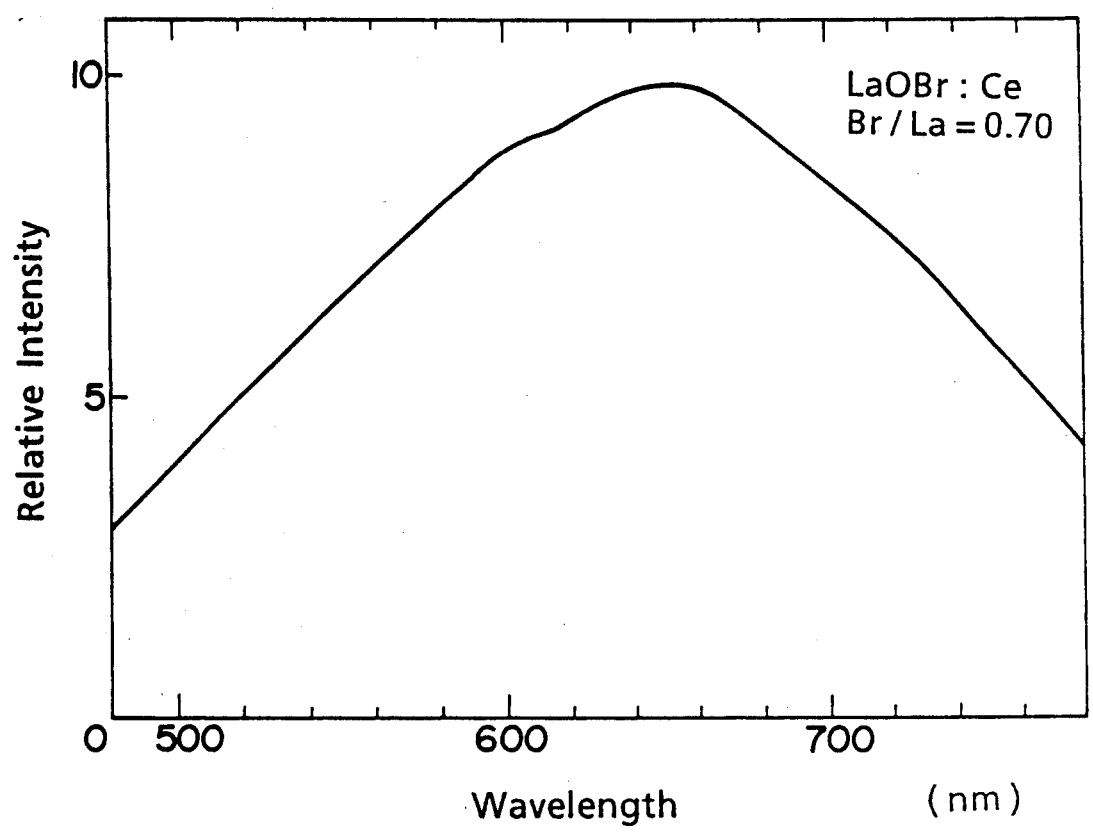
FIG. 4 and FIG. 5 show the stimulation spectra of the phosphors according to the present invention.

The result is shown in FIG. 4. As is evident from FIG. 4, the maximum peak of stimulation spectrum of the panel of Example 5 is located at 660 nm, which is longer than those of LaOBr:Ce,Tb phosphor described in Japanese Patent Publication No. 59(1984)-44339 (i.e., 530 nm) and $LaOBr:Ce^{3+}$ phosphor described in U.S. Pat. No. 4,539,137 (i.e., 480 nm).

Measurement of luminance of stimulated emission

With respect to the panels of Example 5, Comparison Example 4 and Comparison Example 5, the luminances of stimulated emissions were also measured in the same manner of the cases of $GdOCl:10^{-3}Ce^{3+}$.

The results are set forth in Table 3, in which the values are relatively determined on the basis of the luminance of the panel of Example 5 to be set at 100.

TABLE 3

|  | Br/La (atomic ratio) | luminance (relative value) |
| --- | --- | --- |
| Example 5 | 0.700 | 100 |
| Comparison Example 4 | 0.430 | 12 |
| Comparison | 1.520 | 5 |

TABLE 3-continued

| | Br/La (atomic ratio) | luminance (relative value) |
|---|---|---|
| Example 5 | | |

As is evident from Table 3, the luminance of stimulated emission of the radiation image storage panel of the present invention ($0.500 < \text{Br/La} \leq 0.998$) is much higher than those of the panels which include the phosphors whose ratios (Br/La) do not satisfy said condition.

EXAMPLE 6

Preparation of cerium activated yttrium oxychloride phosphor and a radiation image storage panel employing the same The procedure of Example 1 was repeated except for using a mixture of 180.64 g (0.8 mol) of yttrium oxide ($Y_2O_3$), 106.9 g (2.0 mol) of ammonium chloride ($NH_4Cl$) and 0.394 g ($1.6 \times 10^{-3}$ mol) of cerium chloride ($CeCl_3$) as a mixture of starting materials for the phosphor, to obtain a powdery cerium activated yttrium oxychloride phosphor ($YOCl:10^{-3} Ce^{3+}$).

The ratio between Y and Cl included in the phosphor was determined by the following manner.

First, the aqueous solution of the phosphor was prepared. Then, the ratio Cl/Y was determined by measuring the concentration of Y and Cl in the solution by means of chelatometric titration analysis and potentiometric titration analysis, respectively. From the results of the measurements, the ratio Cl/Y of the phosphor was determined as Cl/Y = 0.700 by atomic ratio.

A radiation image storage panel using said phosphor was prepared in the safe manner described in Example 1.

COMPARISON EXAMPLE 6

The procedure of Example 1 was repeated except for using a mixture of 180.64 g (0.8 mol) of yttrium oxide ($Y_2O_3$), 53.45 g (1.0 mol) of ammonium chloride ($NH_4Cl$) and 0.394 g ($1.6 \times 10^{-3}$ mol) of cerium chloride ($CeCl_3$) as a mixture of starting materials for the phosphor, to obtain a powdery cerium activated yttrium oxychloride phosphor ($YOCl:10^{-3} Ce^{3+}$).

The ratio between Y and Cl included in the phosphor was determined in the same manner described in Example 6, and was found: Cl/Y = 0.130 by atomic ratio.

A radiation image storage panel using said phosphor was prepared in the same manner described in Example 1.

COMPARISON EXAMPLE 7

The procedure of Example 1 was repeated except for using a mixture of 180.64 g (0.8 mol) of yttrium oxide ($Y_2O_3$), 213.8 g (4.0 mol) of ammonium chloride ($NH_4Cl$) and 0.394 g ($1.6 \times 10^{-3}$ mol) of cerium chloride ($CeCl_3$) as a mixture of starting materials for the phosphor, to obtain a powdery cerium activated yttrium oxychloride phosphor ($YOCl:10^{-3} Ce^{3+}$).

The ratio between Y and Cl included in the phosphor was determined in the same manner described in Example 6, and was found: Cl/Y = 1.140 by atomic ratio.

A radiation image storage panel using said phosphor wa prepared in the same manner described in Example 1.

Measurement of stimulation spectrum

The stimulation spectrum of the radiation image storage panel of Example 6 was measured in the same manner of the cases of $GdOCl:10^{-3}Ce^{3+}$ and $LaOBr:10^{-3}Ce^{3+}$.

Figure 5:
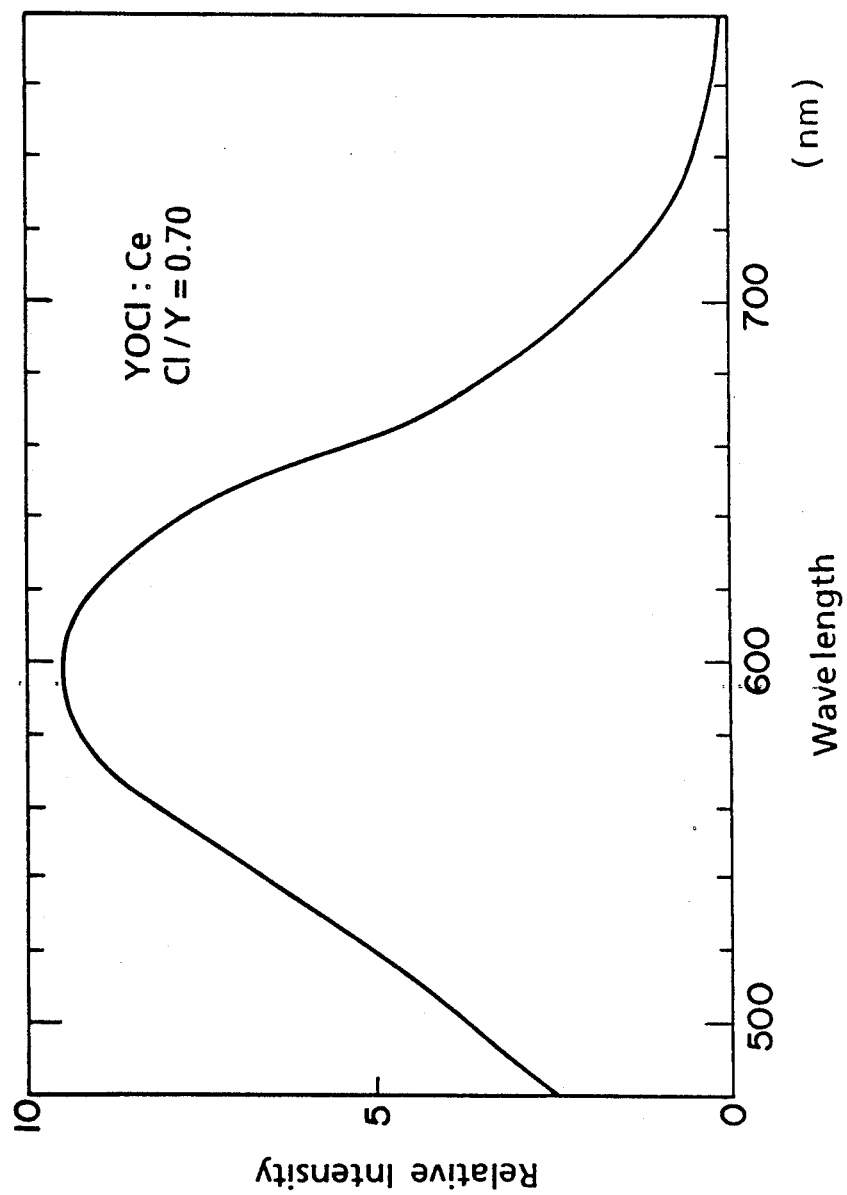

The result is shown in FIG. 5. As shown in FIG. 5, the maximum peak of stimulation spectrum of the panel of Example 6 is located at 600 nm.

Measurement of luminance of stimulated emission

With respect to the panels of Example 6, Comparison Example 6 and Comparison Example 7, the luminances of stimulated emissions were also measured in the same manner of the cases of $GdOCl:10^{-3}Ce^{3+}$ and $LaOBr:10^{-3}Ce^{3+}$.

The results are set forth in Table 4, in which the values are relatively determined on the basis of the luminance of the panel of Example 6 to be set at 100.

TABLE 4

| | Cl/Y (atomic ratio) | luminance (relative value) |
|---|---|---|
| Example 6 | 0.700 | 100 |
| Comparison Example 6 | 0.130 | 27 |
| Comparison Example 7 | 1.140 | 3 |

As is evident from Table 4, the luminance of stimulated emission of the radiation image storage panel of the present invention ($0.500 < \text{Cl/Y} \leq 0.998$) is much higher than those of the panels which include the phosphors whose ratios (Cl/Y) do not satisfy said condition.

EXAMPLE 7

Preparation of cerium activated gadolinium oxychloridebromide phosphor and a radiation image storage panel employing the same The procedure of Example 1 was repeated except for using a mixture of 362.5 g (0.8 mol) of gadolinium oxide ($Gd_2O_3$), 90.87 g (1.7 mol) of ammonium chloride ($NH_4Cl$), 29.37 g (0.3 mol) of ammonium bromide ($NH_4Br$) and 0.394 g ($1.6 \times 10^{-3}$ mol) of cerium chloride ($CeCl_3$) as a mixture of starting materials for the phosphor, to obtain a powdery cerium activated gadolinium oxychloridebromide phosphor ($GdOCl_{0.85}Br_{0.15}:10^{-3} Ce^{3+}$).

The ratio between Gd and halogen X (Cl and Br) included in the phosphor was determined by the following manner.

First, the aqueous solution of the phosphor was prepared. Then, the ratio X/Gd was determined by measuring the concentration of Gd and halogen X (i.e., Cl and Br) in the solution by means of chelatometric titration analysis and potentiometric titration analysis, respectively. From the results of the measurements, the ratio X/Gd of the phosphor was determined as X/Gd = 0.890 by atomic ratio. (The halogen X means the total of Cl and Br.)

A radiation image storage panel using said phosphor was prepared in the same manner described in Example 1.

Measurement of luminance of stimulated emission

With respect to the panel of Example 7, the luminance of stimulated emission was measured in the same manner of the cases of $GdOCl:10.3Ce3+$ and so on.

The result is set forth in Table 5 with the luminances of Example 2 (Cl/Gd=0.730), Comparison Example 1 (Cl/Gd =0.400) and Comparison Example 3 (Cl/Gd=1.030), for reference. The values in Table 5 are relatively determined on the basis of the luminance of the panel of Example 2 to be set at 100.

TABLE 5

|  | X/Cl (atomic ratio) | luminances (relative value) |
| --- | --- | --- |
| Example 7 | 0.890 | 95 |
| Example 2 | 0.730 | 100 |
| Comparison Example 1 | 0.400 | 42 |
| Comparison Example 3 | 1.030 | 13 |

As is evident from the above-mentioned Examples and Comparison Examples, the phosphor of the present invention, that is, a cerium activated rare earth oxyhalide phosphor which has a maximum peak of the stimulation spectrum located at longer wavelength than those of the known cerium activated rare earth oxyhalide phosphors are, exhibits high luminance of stimulated emission.

As is also evident from the above-mentioned Examples and Comparison Examples, the phosphor of the present invention having a maximum peak of the stimulation spectrum located at longer wavelength exhibits high luminance of the stimulated emission as much as, or more than it absorbs sufficient amount of the stimulating rays radiated from He-Ne lasers or semiconductor lasers which are advantageous sources of stimulating light. Therefore, a radiation image recording and reproducing method and a radiation image storage panel of the present invention employing said phosphor are also very advantageous.

We claim:

1. A cerium activated rare earth oxyhalide phosphor having a crystal structure that is the same as PbFCl, wherein Ln, O and X are crystal matrix elements in which Ln is at least one rare earth element selected from the group consisting of Y, La, Gd and Lu; X is at least one halogen selected from the group consisting of Cl, Br and I; and the quantity of Ce per mole of rare earth oxyhalide is represented by x, where x is a number satisfying the condition of $0 < x \leq 0.2$, and a ratio between said Ln and said X satisfy the condition of $0.500 < X/Ln \leq 0.998$ by atomic ratio; said phosphor exhibiting a stimulation spectrum having a maximum peak located at λ which is a wavelength satisfying the condition of 550 nm$<\lambda<$700 nm, said λ being at a longer wavelength than the λ of the phosphor as defined above except where $X/Ln > 0.998$.

2. The phosphor as claimed in claim 1, in which the ratio between said Ln and said X satisfy the condition of $0.700 < X/Ln \leq 0.995$ by atomic ratio.

3. The phosphor as claimed in claim 1, in which the ratio between said Ln and said X satisfy the condition of $0.800 < X/Ln \leq 0.990$ by atomic ratio.

4. The phosphor as claimed in claim 1, in which ln is at least one rare earth element selected from the group consisting of Y, La and Gd; X is at least one halogen selected from the group consisting of Cl and Br.

5. A radiation image recording and reproducing method comprising the steps of:
(i) causing a cerium activated rare earth oxyhalide phosphor having a crystal structure that is the same as PbFCl, wherein Ln, O and X are crystal matrix elements in which Ln is at least one rare earth element selected from the group consisting of Y, La, Gd and Lu; X is at least one halogen selected from the group consisting of Cl, Br and I; and the quantity of Ce per mole of rare earth oxyhalide is represented by x where x is a number satisfying the condition of $0 < x \leq 0.2$, and a ratio between said Ln and said X satisfy the condition of $0.500 < X/Ln < 0.998$ by atomic ratio; said phosphor exhibiting a stimulation spectrum having a maximum peak located at λ which is a wavelength satisfying the condition of 550 nm $<\lambda<$ 700 nm, said λ being at a longer wavelength than the λ of the phosphor as defined above except where $X/Ln > 0.998$, to absorb a radiation having passed through an object or having radiated from an object;
(ii) exposing said stimulable phosphor to an electromagnetic wave having a wavelength within the range from 550 nm to 850 nm to release a radiation energy stored therein as light emission; and
(iii) detecting the emitted light.

6. The radiation image recording and reproducing method as claimed in claim 6, in which the ratio between said Ln and said X of said phosphor satisfy the condition of $0.700 < X/Ln \leq 0.995$ by atomic ratio.

7. The radiation image recording and reproducing method as claimed in claim 6, in which the ratio between said Ln and said X of said phosphor satisfy the condition of $0.800 < X/Ln \leq 0.990$ by atomic ratio.

8. The radiation image recording and reproducing method as claimed in claim 5, in which Ln is at least one rare earth element selected from the group consisting of Y, La and Gd; X is at least one halogen selected from the group consisting of Cl and Br.

9. The radiation image recording and reproducing method as claimed in claim 5, in which the electromagnetic wave has a wavelength within the range from 600 nm to 830 nm.

10. A radiation image storage panel which has a stimulable phosphor layer including a cerium activated rare earth oxyhalide phosphor having a crystal structure that is the same as PbFCl, wherein Ln, O and X are crystal matrix elements in which Ln is at least one rare earth element selected from the group consisting of Y, La, Gd and Lu; X is at least one halogen selected from the group consisting of Cl, Br and I; and the quantity of Ce per mole of rare earth oxyhalide is represented by x, where x is a number satisfying the condition of $0 < x \leq 0.2$, and a ratio between said Ln and said X satisfy the condition of $0.500 < X/Ln \leq 0.998$ by atomic ratio; said phosphor exhibiting a stimulation spectrum having a maximum peak located at λ which is a wavelength satisfying the condition of 550 nm$<\lambda<$700 nm, said λ being at a longer wavelength than the λ of the phosphor as defined above except where $X/Ln > 0.998$.

11. The radiation image storage panel as claimed in claim 10, in which the ratio between said Ln and said X of said phosphor satisfy the condition of $0.700 < X/Ln \leq 0.995$ by atomic ratio.

12. The radiation image storage panel as claimed in claim 10, in which the ratio between said Ln and said X of said phosphor satisfy the condition of $0.800 < X/Ln \leq 0.990$ by atomic ratio.

13. The radiation image storage panel as claimed in claim 10, in which Ln is at least one rare earth element selected from the group consisting of Y, La and Gd; X is at least one halogen selected from the group consisting of Cl and Br.

* * * * *